(12) United States Patent
Vlacheas et al.

(10) Patent No.: US 12,474,160 B2
(45) Date of Patent: Nov. 18, 2025

(54) AUTOMATED SYSTEM AND METHOD FOR ESTIMATING AVERAGE FISH WEIGHT IN AN AQUACULTURE ENVIRONMENT

(71) Applicant: WINGS ICT Solutions Private Company, Athens (GR)

(72) Inventors: Panagiotis Vlacheas, Athens (GR); Kostas Tsagkaris, Athens (GR); Loizos Koutsantonis, N. Smirni (GR); George Anogiatis, Athens (GR); Panagiotis Demestichas, Athens (GR)

(73) Assignee: WINGS ICT Solutions Private Company, Athens (GR)

( * ) Notice: Subject to any disclaimer, the term of this patent is extended or adjusted under 35 U.S.C. 154(b) by 374 days.

(21) Appl. No.: 18/100,509

(22) Filed: Jan. 23, 2023

(65) Prior Publication Data

US 2024/0237624 A1 Jul. 18, 2024

(30) Foreign Application Priority Data

Jan. 13, 2023 (GR) .............................. 20230100022

(51) Int. Cl.
G06K 9/00 (2022.01)
G01B 11/04 (2006.01)
G06V 40/10 (2022.01)

(52) U.S. Cl.
CPC .......... *G01B 11/043* (2013.01); *G01B 11/046* (2013.01); *G06V 40/10* (2022.01)

(58) Field of Classification Search
CPC ........ Y02A 40/81; G06V 20/05; G06V 10/82; G06V 10/764; G06V 10/25; A01K 61/95;
(Continued)

(56) References Cited

U.S. PATENT DOCUMENTS

2019/0228218 A1* 7/2019 James .................... A01K 61/95
2021/0321593 A1* 10/2021 Ma ........................ G06V 40/103
(Continued)

FOREIGN PATENT DOCUMENTS

WO WO-2019232247 A1 * 12/2019 ............. A01K 61/13

OTHER PUBLICATIONS

International Search Report and Written Opinion dated May 21, 2024, International Application No. PCT/EP2024/050595, 18 pages.
(Continued)

*Primary Examiner* — Gregory A Morse
*Assistant Examiner* — Owais Iqbal Memon
(74) *Attorney, Agent, or Firm* — Lessani Law Group, PC

(57) ABSTRACT

The present disclosure relates to an automated method, computer program, and system for estimating the average fish weight in an aquaculture environment. An underwater camera in the aquaculture environment captures video frames from the environment. These frames are inputted into a machine learning detection model that has been trained to detect fish. The machine-learning vision detection model identifies a virtual box-region around detected fish and outputs size and location for the virtual-box regions, as well pixel data related to the virtual-box region and the frame as a whole. This size, location, and pixel data is processed and then inputted into an AI-based length estimation model, which computes a fish length for each virtual-box region inputted into the model. The system then calculates the average fish weight from the fish length using an analytical model.

15 Claims, 8 Drawing Sheets

(58) Field of Classification Search
CPC .............. G01B 11/046; G01B 11/043; G06T 2207/20084; G06T 2207/10016; G06N 3/08; G06N 3/045; G06N 3/0464
See application file for complete search history.

(56) References Cited

U.S. PATENT DOCUMENTS

| | | | |
|---|---|---|---|
| 2022/0327721 A1* | 10/2022 | Tomimori | G06T 7/62 |
| 2023/0177668 A1* | 6/2023 | Ling | A01K 61/95 |
| | | | 348/81 |
| 2023/0217906 A1* | 7/2023 | Girdhar | H04B 11/00 |
| | | | 119/215 |

OTHER PUBLICATIONS

Costa, C. et al., "Extracting fish size using dual underwater cameras", Aquacultural Engineering, Elsevier Science Publishers Ltd., vol. 35, No. 3, Oct. 2006, pp. 218-227.

Voskakis, Dimitris et al., "Deep learning based fish length estimation. An application for the mediterranean aquaculture", Sep. 20, 2021, pp. 1-5.

* cited by examiner

AUTOMATED SYSTEM AND METHOD FOR ESTIMATING AVERAGE FISH WEIGHT IN AN AQUACULTURE ENVIRONMENT

RELATED APPLICATIONS

In accordance with 35 USC 119(a), this application claims priority from Greece Patent Application No. 20230100022 filed with the Hellenic Industrial Property Organization (OBI) in Greece on Jan. 13, 2023.

1. FIELD OF THE INVENTION

This invention relates generally to aquaculture management and computer vision software, and, more specifically, to a machine-learning method for ascertaining the average fish weight in an aquaculture environment.

2. DESCRIPTION OF THE BACKGROUND ART

Fish average weight estimation constitutes a common problem in the aquaculture industry. In intensive fish farming, the reliable estimation of fish average weight is very important for aquaculture industries. Fish biomass is derived from the total number of fish counted in a specific area multiplied by the average weight of fish sampled, which can be used to predict daily intake demand to avoid underfeeding or overfeeding. Fish biomass data can help aquaculture industries ensure optimum use of the capital invested in facilities and control water quality affected by overfeeding. Quantitative estimation of fish average weight is the basis of scientific aquaculture farm management and conservation strategies for sustainable fish production. Therefore, it is crucial for aquafarmers to be able to estimate average fish weight and consequently biomass accurately.

Traditional measurement methods of average fish weight involve extracting live fish from the ponds. Unfortunately, manual sampling often causes physical damage or great stress to the fish, affecting its welfare and growth. In addition, manual sampling is time consuming and laborious, and it has an inherent inaccuracy of 15 to 25 percent. Furthermore, weight measurement is a time-consuming procedure because of the huge number of fish that must be weighed in order to obtain a reliable average weight computation. Despite this, in many farms, the sampling does not even cover 1% of its population, which makes the sampling unreliable. Manual sampling occurs once per month in the best case and often not even that frequently. Therefore, there is long-felt demand for a non-invasive, rapid, and economically feasible method for fish average weight estimation in an aquaculture environment.

SUMMARY OF THE DISCLOSURE

The present disclosure relates to an automated method, computer program, and system for estimating the average fish weight in an aquaculture environment. An underwater camera in the aquaculture environment captures video frames from the environment. These frames are preprocessed to improve image quality and normalize brightness. The preprocessed frames are then inputted into a machine-learning vison detection model that has been trained to detect fish. The machine-learning vision detection model identifies a virtual box-region around each detected fish. It then outputs size and location data for each identified virtual-box region, as well pixel data related to the virtual-box region and the frame in which the box-region resides. This size, location, and pixel data is processed and then inputted into an AI-based length estimation model, which computes a fish length for each virtual box-region. The size of the box-region serves as an initial proxy for the fish size. This initial size estimated is refined by the AI-based length estimation model, which uses the input pixel data to account for camera configurations and the distance of the fish from the underwater camera at the time the video frame was captured. The system calculates the average fish weight from the fish length using an analytical model.

In one embodiment, a method for computing an average fish weight in an aquaculture environment comprises the following steps:
receiving video frames from an underwater camera in an aquaculture environment;
preprocessing the video frames to improve image quality and normalize image brightness;
detecting fish within the video frames using a machine-learning vision detection model, wherein the machine-learning vision detection model is a first machine-learning model trained to detect fish in video frames from an aquaculture environment, and wherein the machine vision detection model performs the following method for each detected fish:
identifying a virtual box-region enclosing the fish;
computing a coordinate location for the virtual box-region within a video frame;
computing a length and width of the virtual box-region; and
outputting the coordinate location of the virtual box region, the length and width of the virtual box region, first pixel data for the virtual box-region, and second pixel data for the whole video frame in which the fish was detected;
computing a length estimate for each detected fish by applying the output of the machine vision detection model to an AI-based length estimation model, wherein the AI-based length estimation model is a second machine-learning model trained to predict a length estimate for a fish based on output of the machine-learning vision model; and
computing an average weight of the fish in the aquaculture environment based on the length estimate computed for each detected fish.

DETAILED DESCRIPTION OF THE PREFERRED EMBODIMENTS

The present disclosure relates to an automated method, computer program, and system for estimating the average fish weight in an aquaculture environment. The methods described herein are performed by a computer system ("the system").

1. System for Average Fish Weight Computation

Figure 1:
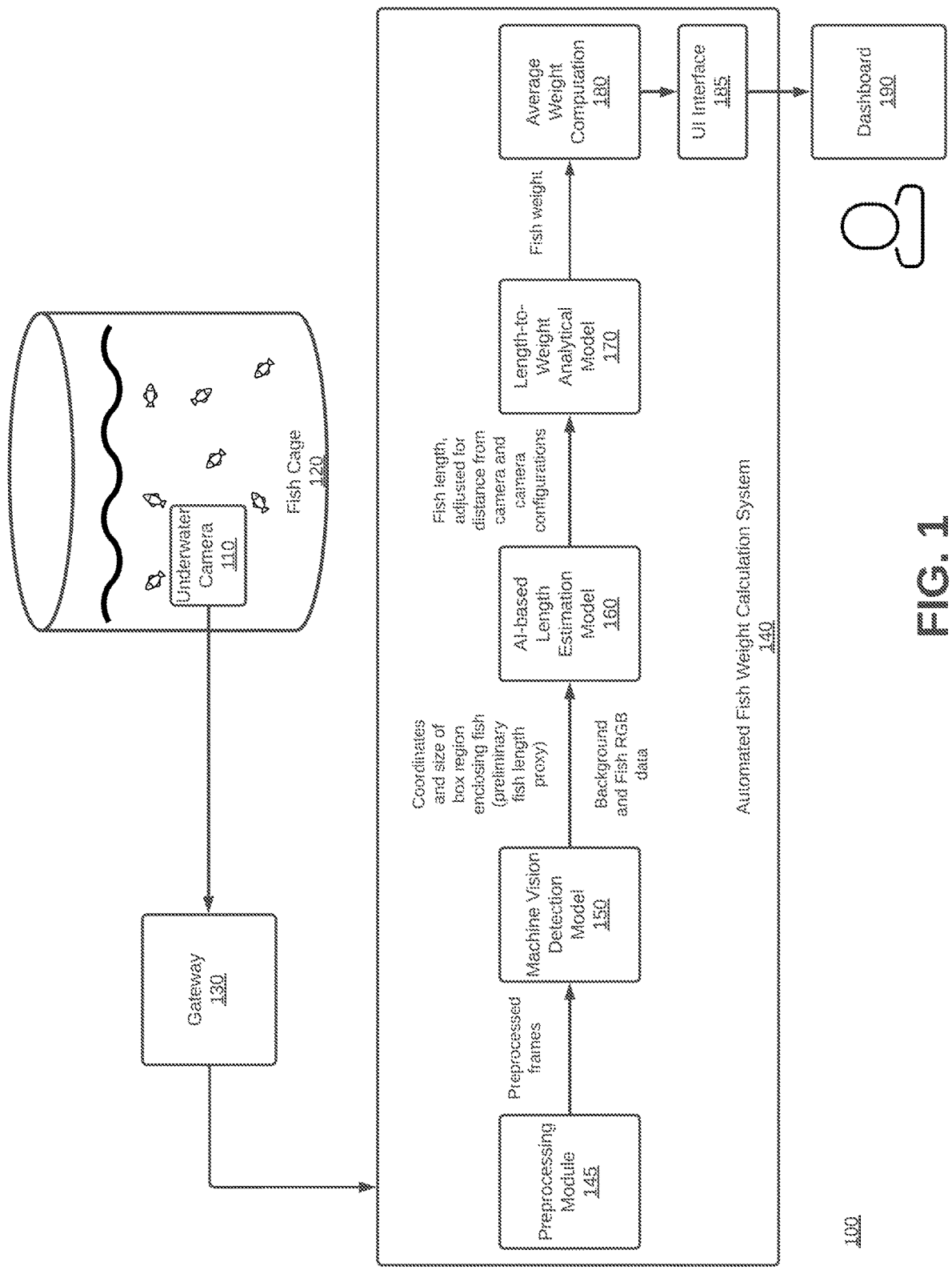
FIG. 1 is a block diagram that illustrates an example system for automated average fish weight computation.

FIG. 1 illustrates an example system 100 for automated average fish weight computation. One or more underwater cameras 110 capture video from the aquaculture environment 120. In one embodiment, each camera 110 is a monocular camera versus a more costly stereovision camera. Video from the underwater cameras is transmitted to an automated fish weight calculation system 140 via gateway 130.

System 140 includes a Preprocessing Module 145, a Machine Vision Detection Module 150, an AI-based Length Estimation Model 160, a Length-to-Weight Analytical Model 170, an Average Weight Computation module 180, and a UI Interface module 185.

The preprocessing module 145 preprocesses the video frames to improve image quality and normalize brightness. The Machine Vision Fish Detection Model 150 is a machine-learning model that receives the video frames as input, detects fish within the frames, and outputs data for detected fish. The Machine Vision Fish Detection Model is trained to classify fish, localize fish, and define the size of the fish. In one embodiment, the Model uses a YOLO (e.g., YOLOv3) real-time object detection algorithm. The algorithm identifies features in the frames that are learned by a deep convolutional neural network (CNN). It represents the size of a detected fish by a virtual box-region enclosing the localized fish. The Model outputs length and width measurements, center coordinates, and RGB pixel data for the virtual box-region enclosing the fish, as well as background RGB pixel data for the frame.

The AI-based Length Estimation Model 160 is a machine-learning model that takes the output of the Machine Vision Detection Model and outputs a length estimate for each of the detected fish in standard industry (SI) units (e.g., millimeters). The RGB pixel data in a box-region varies based on camera configurations and the distance of the enclosed fish from the camera at the time a video image of the fish is captured. In training, the AI-based Length Estimation Model learns how fish RGB pixel data and background RGB pixel data affect fish length relative to the size of the box-region surrounding the fish. In one embodiment, the AI-based Length Estimation Model is a neural network model, such as a Multilayer Perceptron model.

The Length-to-Weight Analytical Model 170 uses a length-to-weight mathematical formula to calculate a fish's weight based on its length. The formula, which is species specific, is based on known bibliography data linking the length of a fish to its weight.

The Average Weight Computation module 180 receives the fish weights for the detected fish and computes an average weight for the fish in the Fish Cage 120, after removing outlier weights.

The UI interface module 185 generates a dashboard page with the average fish weight data, which is displayed on a computing device 190 of an aquaculture environment manager.

Figure 2A:
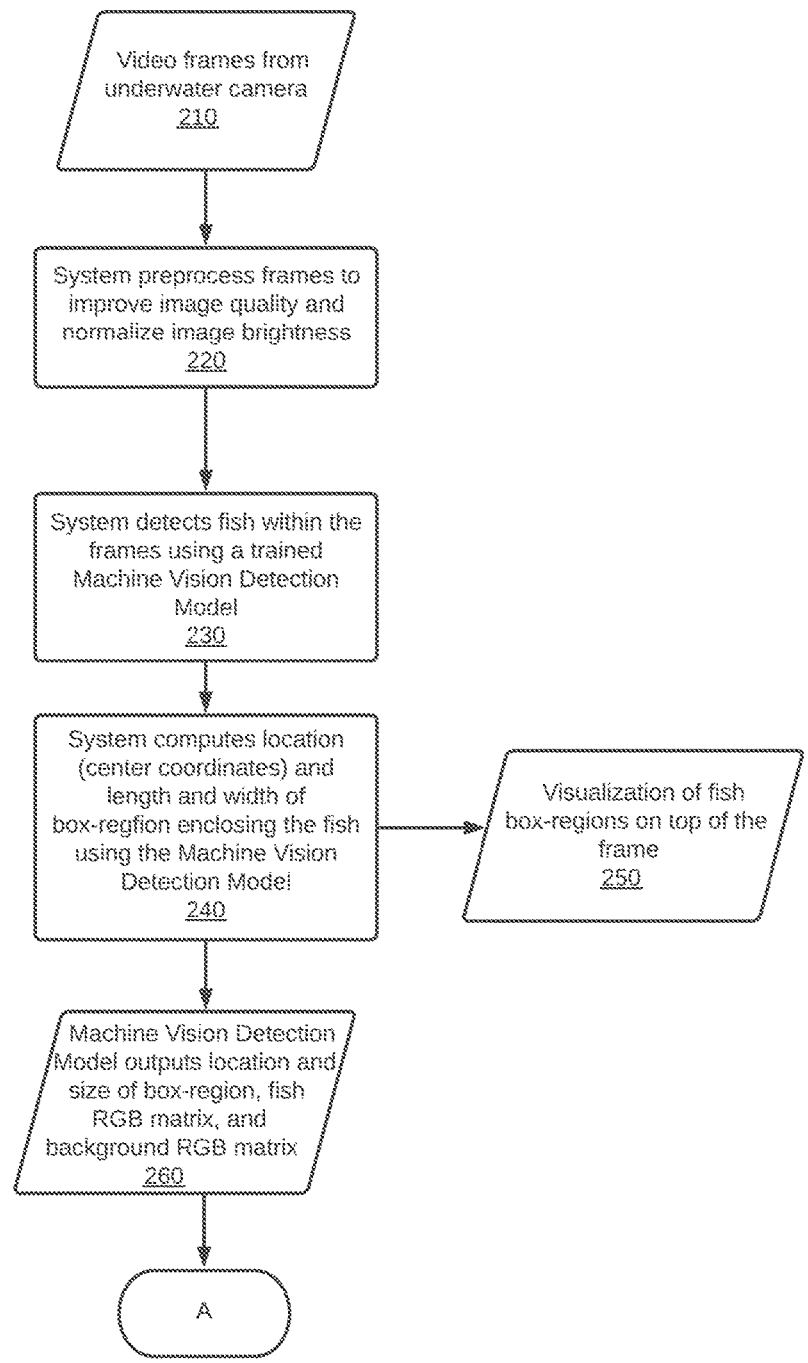
FIGS. 2A-B are flowcharts illustrate a method, according to one embodiment, for computing average fish weight in an aquaculture environment.
Figure 2B:
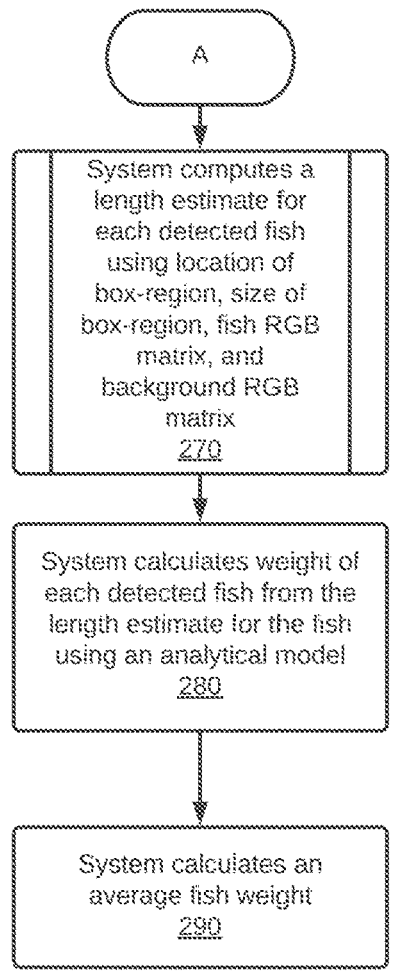

The method in which system 140 calculates an average fish weight is described in more detail with respect to FIGS. 2A-2B.

2. Automated Method for Computing Average Fish Weight in an Aquaculture Environment FIGS. 2A-B illustrate a method for computing average fish weight in an aquaculture environment. This is an automated method performed by the system. The system receives video frames from an underwater camera in the aquaculture environment (step 210). In one embodiment, these are videos of a specific duration captured at a specific time of day, wherein the duration and time of day is the same as those of the videos used to train the Machine Vision Detection Model.

The system preprocesses the frames to remove image quality and normalize image brightness (step 220). The frames are preprocessed to address difficulties associated with turbidity and low levels of luminosity. Turbidity is a measure of the degree to which water loses its transparency due to the presence of suspended particles. As turbidity increases, it becomes more difficult to detect fish in the aquaculture environment. Likewise, if the luminosity level is low, it can be difficult to separate the fish from the sea environment. In one embodiment, the following preprocessing techniques are employed to improve the system ability to detect fish by getting more clear frames and increasing the contracts between the fish and the aquaculture environment:

Gamma Correction: Enhances frame's contrast to make the fish more distinct

Median Filter: Reduces "salt and pepper" noise

Frame Histogram Equalization: Allows for areas of lower contrast to gain a higher contrast Reshape Function: Used to make the frame compatible to the detection algorithm and to reduce the computational cost, since the evaluation is applied in a frame with lower resolution.

The system detects fish within the frames using the Machine Vision Detection Model (step 230). In one embodiment, a fish is considered to be "detected" if it meets certain criteria, such as being in the focus center of the camera traveling in an angular direction within an acceptable range. In one embodiment, the Machine Vision Detection Model detects all the fish in the frame and then uses statistical filters to select the fish that meets this criteria.

Figure 6:
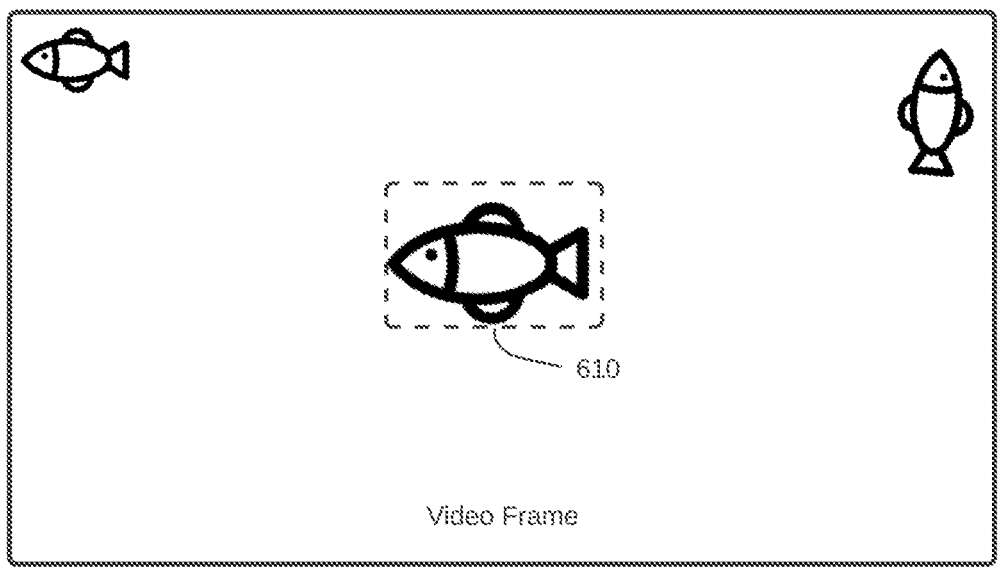
FIG. 6 is a block diagram that illustrates an example of a virtual box-region visualized around a detected fish.

As a result of the detection process, the system identifies virtual box-regions around the detected fish within the frames. The virtual box-regions are boxes visualized by the Model around fish it detects in the frame. An example of a visualized virtual box-region is illustrated in FIG. 6 (see box-region 610). For each detected fish, the Machine Vision Detection Model computes the location of the center coordinates of a virtual box-region enclosing the fish (step 240). The Model also computes the length and width of the virtual box-region enclosing the fish (also step 240). This length and width may be computed in number of pixels. The result is a visualized virtual box region around the detected fish (step 250).

For each virtual box-region identified by the Machine Vision Detection Model, the Model outputs center coordinates of the box region, the length and width of the box region, a "fish RGB matrix", and a "background RGB matrix" (step 260). The outputted length and width of the box-region is an initial estimate of the length and width of the fish. However, this may not be an accurate length calculation because the size of the virtual box-region will depend on the camera configurations and the distance of the fish from the camera. For example, assume fish A is larger than Fish B. If Fish A is further away from the camera than Fish B when the frame in which they appear is captured, then Fish A's virtual box-region may be smaller than Fish B's virtual box-region, despite Fish A being larger than Fish B. Therefore, the initial estimated length is refined to a more accurate length calculation using the AI-based Length Estimation Model, as described with respect to step 270.

In one embodiment, the "fish RGB matrix" is a grid of N×N super pixels within the box-region enclosing the fish. N is a positive integer. The N×N size is equal to the length and width of the box-region. The RGB (Red-Green-Blue) values of each super pixels are calculated by averaging the RGB values of the frame pixels composing the super pixel. The result is a N×N×3 matrix with the RGB values of fish super pixels.

In one embodiment, a "background RGB matrix" is a grid of N×N super pixels defined within the entire frame in which the applicable box-region resides. The RGB values of each super pixel are calculated by averaging the RGB values of the frame pixels composing the super pixel. The result is a N×N×3 matrix with the RGB value of background super pixels. The background RGB matrix is calculated for each frame for which at least one fish is detected.

The system uses the AI-based Length Estimation Model to compute a length estimate for each fish detected using the location of the box-region around the fish (i.e., the center coordinates), the length and width of the box region, the fish RGB matrix, and the background RGB matrix (step 270). The output of the AI-based Length Estimate Model is an estimate of the actual length of the fish in Standard Industry (SI) measurement units, such as millimeters. The AI-based Length Estimation Model uses the fish RGB matrix and the background RGB matrix to account for camera configurations and a detected fish's distance from the camera at the time the video frame with the fish was captured. Step 270 is described in more detail with respect to FIG. 3.

The system calculates the weight of each fish from the estimated length of the fish using an analytical model that links length to weight (step 280). The model uses a length-to-weight mathematical formula based on known bibliography data linking the length of a fish to its weight. The formula is species specific.

The system calculates an average fish weight from the individual weights of the detected fish (step 290). In one embodiment, the system removes outlier fish weights in calculating an average fish weight. The outliers may be computed using the Interquartile (IQR) formula. The IQR is defined as the distance between the first quartile (Q1) and the third quartile (Q3):

$$IQR = Q3 - Q1$$

Given a set of values, Q1 is defined as the value below which twenty-five percent of the distribution lies. Q3 is defined as the value below which seventy-five percent of the distribution lies.

The outliers are values below a lower boundary or above an upper boundary:

| | |
|---|---|
| $Q3 + 1.5 * IQR$ | Upper Boundary |
| $Q1 - 1.5 * IQR$ | Lower Boundary |

After the outlier weights are removed, the system averages the remaining weights to obtain the average fish weight.

3. Calculating Fish Length

Figure 3:
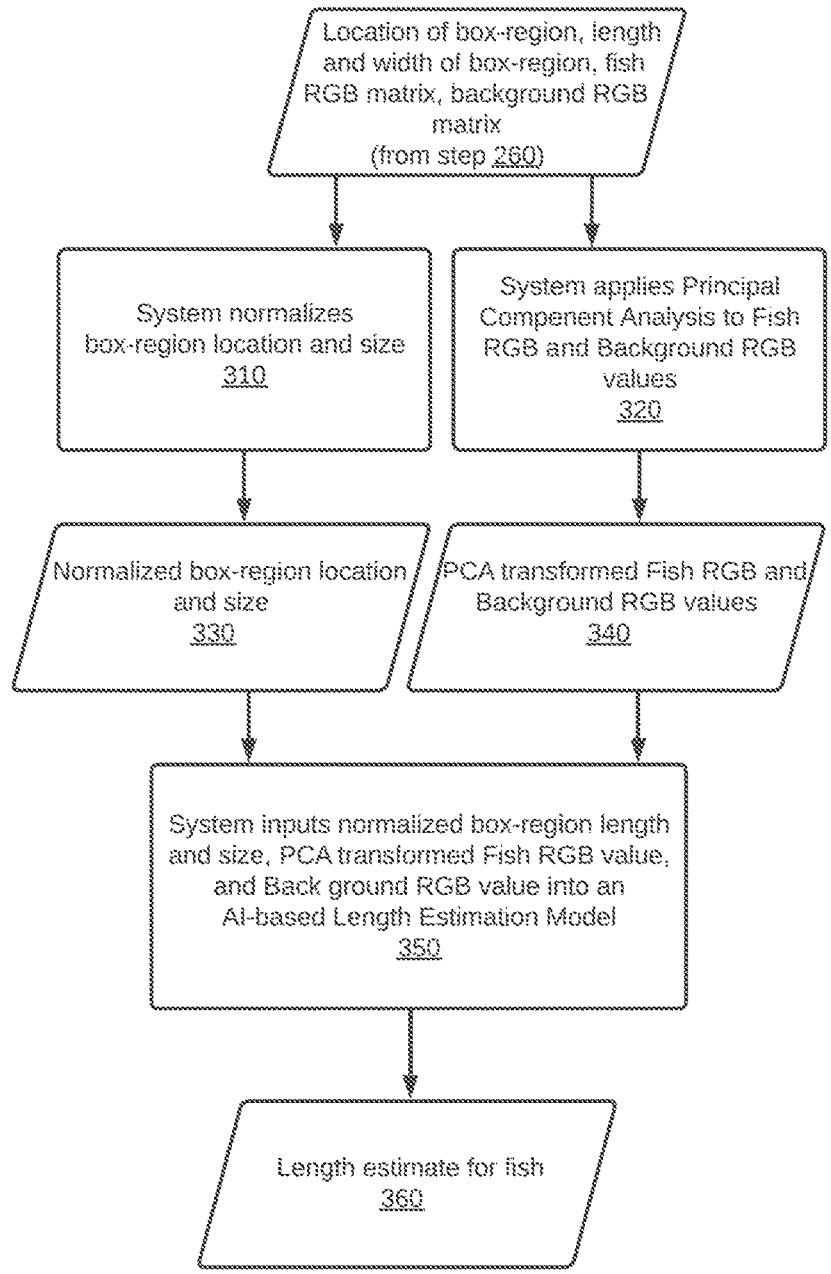
FIG. 3 is a flowchart that illustrates a method, according to one embodiment, for calculating a length for the fish that accounts for camera configurations and the distance of the fish from the underwater camera.

FIG. 3 illustrates step 270 in more detail. Specially, it illustrates a method for calculating a length estimate for a fish. The inputs to the method are the location (e.g., center coordinates), length, and width of a virtual box-region enclosing a fish, the corresponding fish RGB matrix, and the corresponding background RGB matrix. The system normalizes the box-region location and size (step 310). The system also applies Principal Component Analysis to Fish RGB and Background RGB values (step 320). The normalized box-region location and size, as well as the PCA-transformed Fish RGB and Background RGB values are inputs (330, 340) to the AI-based Length Estimation Model. The AI-based Length Estimation model computes and outputs a length estimate for the enclosed fish (steps 350, 360). The AI-based Length Estimation Model uses the fish RGB matrix and the background RGB matrix to account for camera configurations and a detected fish's distance from the camera, which results in a more accurate length calculation for the fish than just the length of the virtual box-region enclosing the fish.

4. Training of Machine Vision Detection Model

Figure 4:
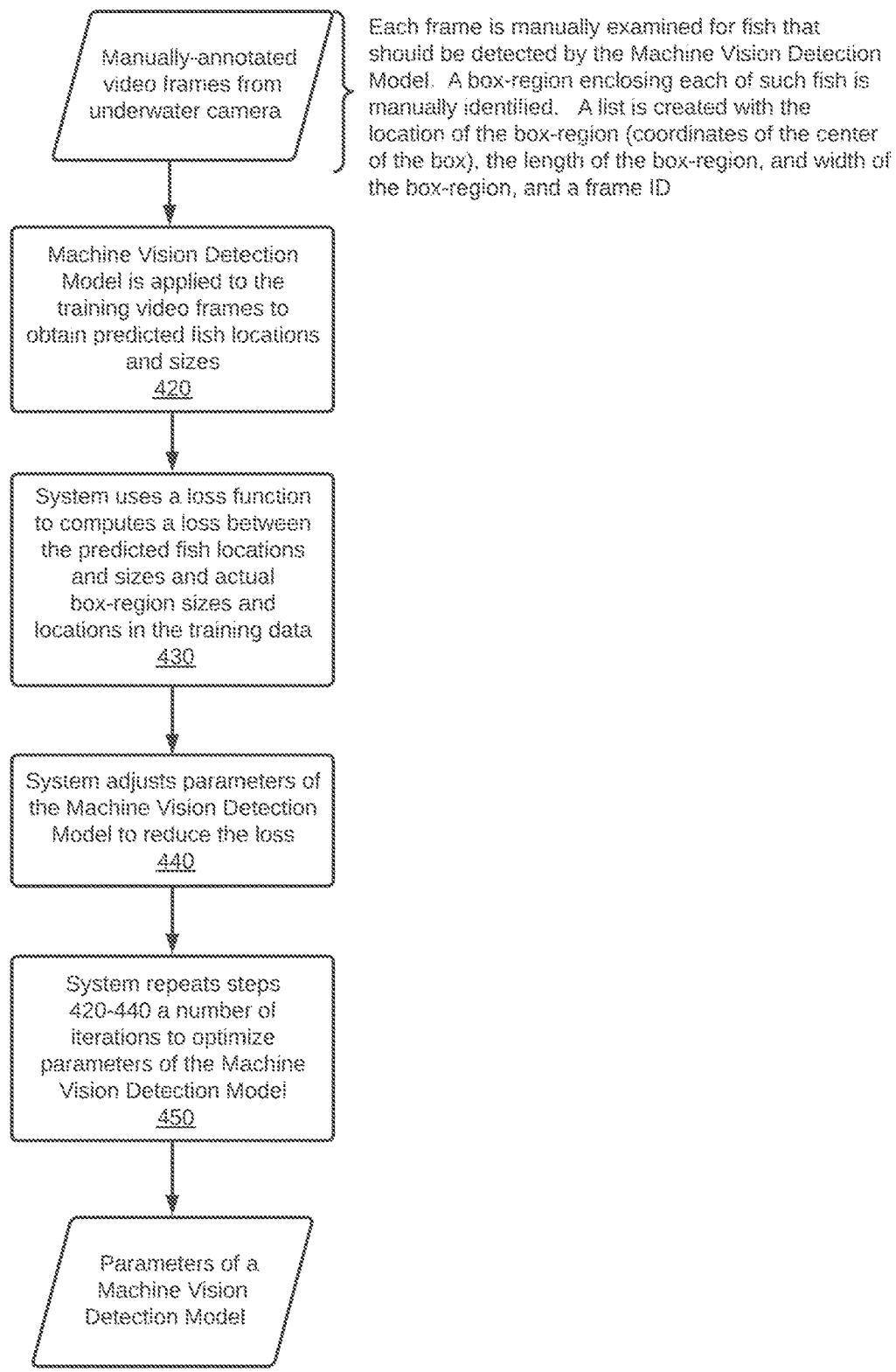
FIG. 4 is a flowchart that illustrates a method for training the Machine Vision Detection Model according to one embodiment.

FIG. 4 illustrates a method for training the Machine Vision Detection Model. The model is trained using a manually-annotated training set of video frames from an underwater camera. The videos in the training set are of a specific duration and at a specific time of day. In one embodiment, the video is captured from different aquaculture sites. Each frame is assigned a unique time stamp.

The training set is manually annotated as follows: Each frame in the training set is manually examined to identify fish that should be detected by the Machine Vision Detection Model. For each identified fish, a box-region enclosing the fish is manually identified. A list is created with data for each manually-identified box region. Specifically, for each manually-identified box region, the list includes the center coordinates of the box-region, the length and width of the box-region, and a frame ID of the video frame in which the box-region resides.

The Machine Vision Detection Model is applied to the training video frames to detect fish within the training video frames (step 420). Specifically, it visualizes virtual box-regions around areas in the video frames that it predicts are fish. The system uses a loss function (e.g., mean-squared error (MSE), binary cross-entropy (BCE), etc.) to computes a loss between the size and location of box-regions for the predicted fish and the size and locations of the manually-identified box-regions in the training data (step 430). The system adjusts parameters of the Machine Vision Detection Model to reduce the loss (step 440). The system repeats steps 420-440 a number of iterations to optimize parameters of the Machine Vision Detection Model (step 450). The number of iterations may be a fixed number or the number it takes until convergence is reached. The optimized parameters are used in the Machine Vision Detection Model used to detect fish in step 230. In one embodiment, the Model is a Convolutional Neural Network

5. Training of AI-Based Length Estimation Model

Figure 5A:
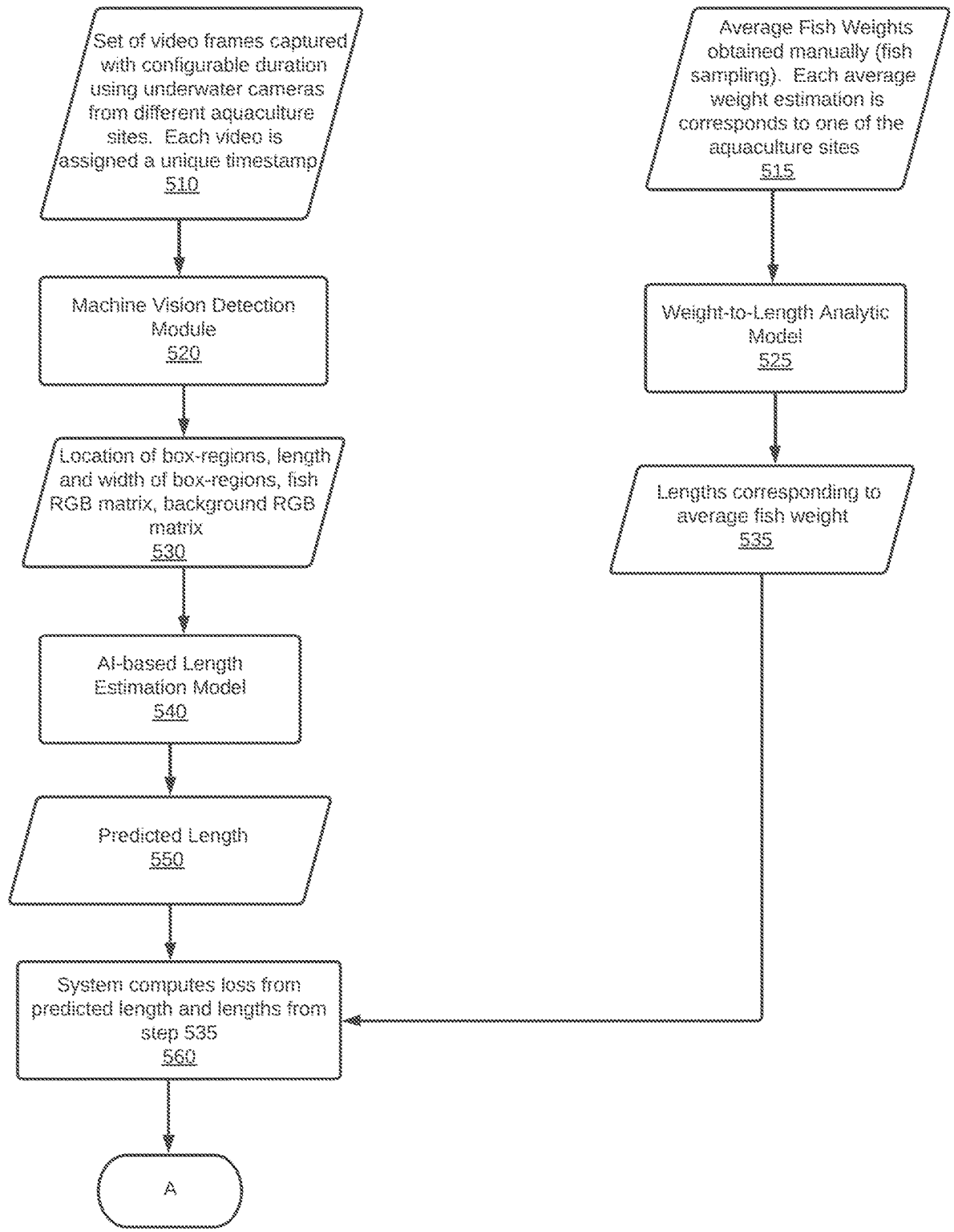
FIGS. 5A and 5B are flowcharts that illustrate a method for training the AI-based Length Estimation Model according to one embodiment.
Figure 5B:
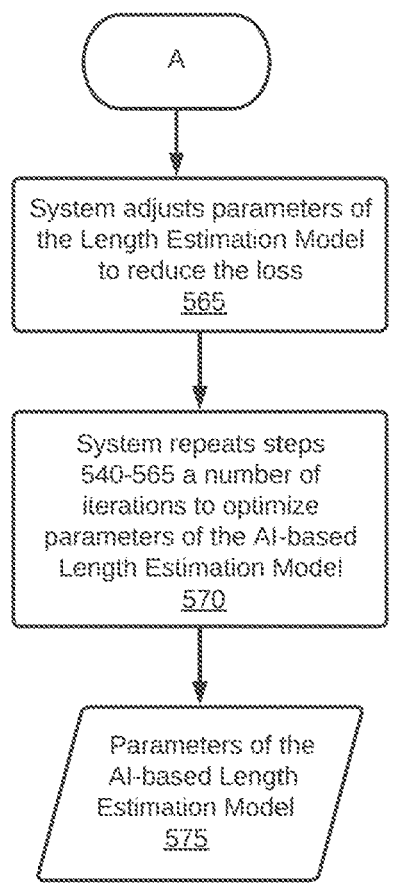

FIGS. 5A and 5B illustrate a method for training the AI-based Length Estimation Model according to one embodiment. The system receives a set of video frames captured with configurable duration using underwater cameras from different aquaculture sites (step 510). Each video is assigned a unique time stamp. The training set for training the AI-based Length Estimation Model may be the same as that used to train the Machine Vision Detection Model. For each aquaculture sited from which the training video frames were obtained, the system also receives an average fish weight estimate for the site obtained from manual sampling of the site. The manual-obtained average weights are converted to lengths using a Weight-to-Length Analytic Model (steps 525-535). This Weight-to-Length Analytic Model uses the reverse mathematical formula as the Length-to-Weight Analytic Model.

The training videos frames (from 510) are inputted into the trained Machine Vision Detection Model. The Machine Vision Detection Model detects fish in the frames, and, for each detected fish, outputs the location (center coordinates) of the box-region around the fish, length and width of the box regions, the fish RGB matrix, and the background RGB matrix (steps 520-530). The AI-based Length Estimation Model then takes the output of the Machine Vision Detection Model and predicts a length estimate for the detected fish in the video frames (steps 540-550). During the training process, the predicted length estimate for a fish from a particular aquaculture site is then compared to the length computed from the manually-derived average fish weight for that same aquaculture site. The system computes a loss from the predicted lengths and the lengths derived from the manually-derived average fish weight (step 560). The system adjusts the parameters of the AI-Based Length Estimation Model to minimize or reduce the loss (step 565). Steps 540-565 are repeated for a number of iterations (e.g., a fixed number of iterations or until convergence is reached).

6.0 Calculating the Total Fish Biomass in the Aquaculture Environment

The total fish biomass in the aquaculture environment is calculated by multiplying the average fish weight by the number of fish in the aquaculture environment. In one embodiment, the number of fish in the aquaculture environment is ascertained by subtracting the number of countable dead fish from the number of fish initially stocked.

7.0 Advantages

The system and methods disclosed herein enable a fish farmer to calculate the average fish weight at any time and with accuracy by means of an automated and real-time monitoring solution. The system does not require costly stereovision cameras to account for fish distance from the camera in determining fish size. Instead, one or more low-cost monocular cameras can be installed in fixed locations, and distance issues are addressed by the AI-based Length Estimation Model.

The ability to automatically and easily obtain the average fish weight allows for enhanced aquaculture operations. For example, the farmer can better monitor the breeding and grow-out stages of a farmed species. The farmer can better feed the fish in an optimized and timely way to ensure healthy and fast growth of the fish. Furthermore, the farmer can ensure optimum use of the capital invested in facilities. The fish feed is estimated to be the most expensive part of an aquaculture farm operation, often ranging from 60-80% of the overall expenses. Optimizing the feeding amounts through automated and real-time calculation of average fish weight will help significantly reduce the costs of the required feeding amounts.

The farmer also can ensure better water quality by avoiding overfeeding. This will improve the environmental status of the farm due to less feed loss and waste, which will lead to improved sustainability of the aquaculture industry.

8.0 General

The methods described with respect to FIGS. 1-6 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be a stand-alone computer or a network of computers working together, such as in a client-server architecture.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for computing an average fish weight in an aquaculture environment, the method comprising:
   receiving video frames from an underwater camera in an aquaculture environment;
   preprocessing the video frames to improve image quality and normalize image brightness;
   detecting fish within the video frames using a machine-learning vision detection model, wherein the machine-learning vision detection model is a first machine-learning model trained to detect fish in video frames from an aquaculture environment, and wherein the machine-learning vision detection model performs the following method for each detected fish:
      identifying a virtual box-region enclosing the fish;
      computing a coordinate location for the virtual box-region within a video frame;
      computing a length and width of the virtual box-region; and
      outputting the coordinate location of the virtual box-region, the length and width of the virtual box-region, and first pixel data for the virtual box-region and second pixel data for the whole video frame in which the fish was detected, wherein the first pixel data is a grid of N×N super pixels defined within the virtual box-region enclosing the fish, and wherein the second pixel data is a grid of N×N super pixels defined within the whole video frame in which the fish was detected;
   computing a length estimate for each detected fish by applying the output of the machine-learning vision detection model to an AI-based length estimation model, wherein the AI-based length estimation model is a second machine-learning model trained to predict a length estimate for a fish based on output of the machine-learning vision detection model, wherein computing a length estimate for each detected fish further comprises:
      normalizing coordinate and length and width data for the virtual box-region enclosing the fish;
      applying Principal Component Analysis to the first and second pixel data;
      using the normalized coordinate data, normalized length and width data, and the PCA-transformed first and second pixel data as input to the AI-based length estimation model;
   computing a weight for each detected fish based on the length estimate for the fish; and
   computing an average fish weight in the aquaculture environment based on the weights computed for the detected fish.

2. The method of claim 1, wherein the AI-based length estimation model uses the PCA-transformed first and second pixel data to account for camera configurations and the distance of the detected fish from the underwater camera in computing a length estimate for the detected fish.

3. The method of claim 1, wherein the underwater camera is a monocular camera.

4. The method of claim 1, wherein the weight for each detected fish is computed using a length-to-weight mathematical formula based on known bibliography data linking the length of a fish to its weight.

5. The method of claim 1, wherein computing an average fish weight comprises identifying outlier fish weights and filtering out the outlier fish weights from the fish weights used to compute the average fish weight.

6. A system for computing an average fish weight in an aquaculture environment, the system comprising:
one or more processors;
one or more memory units coupled to the one or more processors, wherein the one or more memory units store instructions that, when executed by the one or more processors, cause the system to perform the operations of:
receiving video frames from an underwater camera in an aquaculture environment;
preprocessing the video frames to improve image quality and normalize image brightness;
detecting fish within the video frames using a machine-learning vision detection model, wherein the machine-learning vision detection model is a first machine-learning model trained to detect fish in video frames from an aquaculture environment, and wherein the machine-learning vision detection model performs the following method for each detected fish:
identifying a virtual box-region enclosing the fish;
computing a coordinate location for the virtual box-region within a video frame;
computing a length and width of the virtual box-region; and
outputting the coordinate location of the virtual box-region, the length and width of the virtual box-region, and first pixel data for the virtual box-region and second pixel data for the whole video frame in which the fish was detected, wherein the first pixel data is a grid of N×N super pixels defined within the virtual box-region enclosing the fish, and wherein the second pixel data is a grid of N×N super pixels defined within the whole video frame in which the fish was detected;
computing a length estimate for each detected fish by applying the output of the machine-learning vision detection model to an AI-based length estimation model, wherein the AI-based length estimation model is a second machine-learning model trained to predict a length estimate for a fish based on output of the machine-learning vision detection model, wherein computing a length estimate for each detected fish further comprises:
normalizing coordinate and length and width data for the virtual box-region enclosing the fish;
applying Principal Component Analysis to the first and second pixel data;
using the normalized coordinate data, normalized length and width data, and the PCA-transformed first and second pixel data as input to the AI-based length estimation model;
computing a weight for each detected fish based on the length estimate for the fish; and computing an average fish weight in the aquaculture environment based on the weights computed for the detected fish.

7. The system of claim 6, wherein the AI-based length estimation model uses the PCA-transformed first and second pixel data to account for camera configurations and the distance of the detected fish from the underwater camera in computing a length estimate for the detected fish.

8. The system of claim 6, wherein the underwater camera is a monocular camera.

9. The system of claim 6, wherein the weight for each detected fish is computed using a length-to-weight mathematical formula based on known bibliography data linking the length of a fish to its weight.

10. The system of claim 6, wherein computing an average fish weight comprises identifying outlier fish weights and filtering out the outlier fish weights from the fish weights used to compute the average fish weight.

11. A non-transitory computer-readable medium comprising a computer program, that, when executed by a computer system, enables the computer system to perform the following method for computing an average fish weight in an aquaculture environment, the method comprising:
receiving video frames from an underwater camera in an aquaculture environment;
preprocessing the video frames to improve image quality and normalize image brightness;
detecting fish within the video frames using a machine-learning vision detection model, wherein the machine-learning vision detection model is a first machine-learning model trained to detect fish in video frames from an aquaculture environment, and wherein the machine-learning vision detection model performs the following method for each detected fish:
identifying a virtual box-region enclosing the fish;
computing a coordinate location for the virtual box-region within a video frame;
computing a length and width of the virtual box-region; and
outputting the coordinate location of the virtual box-region, the length and width of the virtual box-region, and first pixel data for the virtual box-region and second pixel data for the whole video frame in which the fish was detected, wherein the first pixel data is a grid of N×N super pixels defined within the virtual box-region enclosing the fish, and wherein the second pixel data is a grid of N×N super pixels defined within the whole video frame in which the fish was detected;
computing a length estimate for each detected fish by applying the output of the machine-learning vision detection model to an AI-based length estimation model, wherein the AI-based length estimation model is a second machine-learning model trained to predict a length estimate for a fish based on output of the machine-learning vision detection model, wherein computing a length estimate for each detected fish further comprises:
normalizing coordinate and length and width data for the virtual box-region enclosing the fish;
applying Principal Component Analysis to the first and second pixel data;
using the normalized coordinate data, normalized length and width data, and the PCA-transformed first and second pixel data as input to the AI-based length estimation model;

computing a weight for each detected fish based on the length estimate for the fish; and computing an average fish weight in the aquaculture environment based on the weights computed for the detected fish.

12. The non-transitory computer-readable medium of claim 11, wherein the AI-based length estimation model uses the PCA-transformed first and second pixel data to account for camera configurations and the distance of the detected fish from the underwater camera in computing a length estimate for the detected fish.

13. The non-transitory computer-readable medium of claim 9, wherein the underwater camera is a monocular camera.

14. The non-transitory computer-readable medium of claim 9, wherein the weight for each detected fish is computed using a length-to-weight mathematical formula based on known bibliography data linking the length of a fish to its weight.

15. The non-transitory computer-readable medium of claim 9, wherein computing an average fish weight comprises identifying outlier fish weights and filtering out the outlier fish weights from the fish weights used to compute the average fish weight.

* * * * *